US012099262B2

(12) United States Patent
Hicks

(10) Patent No.: US 12,099,262 B2
(45) Date of Patent: Sep. 24, 2024

(54) SIDE SHIELD FOR EYEGLASSES

(71) Applicant: Bolle Brands Inc., Carlsbad, CA (US)

(72) Inventor: Jonathan Hicks, Carlsbad, CA (US)

(73) Assignee: Bolle Brands Inc., Carlsbad, CA (US)

( * ) Notice: Subject to any disclaimer, the term of this patent is extended or adjusted under 35 U.S.C. 154(b) by 440 days.

(21) Appl. No.: 17/344,812

(22) Filed: Jun. 10, 2021

(65) Prior Publication Data
US 2022/0397779 A1   Dec. 15, 2022

(51) Int. Cl.
*G02C 7/16* (2006.01)
*G02C 5/16* (2006.01)

(52) U.S. Cl.
CPC ...... *G02C 7/16* (2013.01); *G02C 5/16* (2013.01)

(58) Field of Classification Search
CPC . G02C 7/16; G02C 5/16; G02C 5/146; G02C 11/12; G02C 5/22; G02C 5/2209; G02C 5/14; G02C 5/10; G02C 2200/06; G02C 5/226

See application file for complete search history.

(56) References Cited

U.S. PATENT DOCUMENTS

| 2,346,709 | A |   | 4/1944 | Splaine |
|---|---|---|---|---|
| 2,403,223 | A |   | 7/1946 | Kaesz |
| 3,171,134 | A |   | 3/1965 | Kennedy |
| 5,422,684 | A |   | 6/1995 | Keller |
| 5,608,469 | A | * | 3/1997 | Boll e ............... G02C 11/00 351/44 |
| 5,796,461 | A |   | 8/1998 | Stepan |
| 6,393,609 | B1 |   | 5/2002 | Simmons, Sr. |
| 6,811,255 | B2 |   | 11/2004 | Blanchette et al. |
| 6,984,036 | B1 | * | 1/2006 | Smith .................. G02C 9/00 351/44 |

(Continued)

FOREIGN PATENT DOCUMENTS

GB       2458916 A      10/2009
KR   20120032316 A       4/2012
(Continued)

OTHER PUBLICATIONS

Patent Cooperation Treaty, International Search Report and Written Opinion for International Application No. PCT/US2022/032700, mailed Sep. 13, 2022, 9 pages.

*Primary Examiner* — Joseph P Martinez
*Assistant Examiner* — Ray Alexander Dean
(74) *Attorney, Agent, or Firm* — STETINA BRUNDA GARRED & BRUCKER

(57) ABSTRACT

A side shield for use with an eyeglass frame includes an attachment body having an upper portion and a lower portion. The attachment body is sized and configured to be insertable within a respective inner periphery of the eyeglass frame. An upper projection extends from the upper portion of the attachment body and is configured to be engageable with a respective lens frame body. A lower projection extends from the lower portion of the attachment body and is configured to be engageable with the respective lens frame body. A side shielding wall is connected to the attachment body and includes an upper edge at least partially defining a void sized to allow for pivotal movement of a respective one of the pair of temple arms when the upper and lower projections are engaged with the respective lens frame body.

14 Claims, 4 Drawing Sheets

(56) References Cited

U.S. PATENT DOCUMENTS

| | | | |
|---|---|---|---|
| 6,988,798 B1 | 1/2006 | Duffie | |
| 8,042,936 B2 | 10/2011 | Hobbs | |
| 9,201,251 B2 | 12/2015 | Sadler et al. | |
| 10,627,652 B2 | 4/2020 | Froissard et al. | |
| 2004/0263774 A1* | 12/2004 | Chao ..................... | G02C 11/12 |
| | | | 351/47 |
| 2005/0162609 A1 | 7/2005 | Jung | |
| 2010/0228689 A1 | 9/2010 | Hall | |
| 2012/0105799 A1* | 5/2012 | Stewart .................. | G02C 11/12 |
| | | | 351/158 |
| 2014/0125941 A1 | 5/2014 | Hou | |

FOREIGN PATENT DOCUMENTS

| | | | |
|---|---|---|---|
| TW | M592091 | * | 3/2020 |
| TW | M592091 U | * | 3/2020 |

* cited by examiner

SIDE SHIELD FOR EYEGLASSES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to light shield for use with eyewear, and more specifically to a light shield configured to allow for free pivotal movement of the eyewear's temple arms while the light shield is attached to the eyewear.

2. Description of the Related Art

Bright light can impair an individual's vision, and thus, many people use sunglasses in bright conditions to improve their ability to see in those conditions. Sunglasses may include tinted lenses that mitigate the bright conditions to make it easier for the individual to see when wearing the sunglasses.

Conventional sunglasses typically include a pair of temple arms connected to a front, lens-retaining frame portion. The temple arms may be pivotally connected to the lens-retaining frame portion to facilitate transition of the sunglasses from a compact, closed configuration to an extended, open configuration. When the sunglasses are in the closed configuration, the sunglasses may be placed in a protective case, or placed in a pocket on a wearer's shirt. In the open configuration, the sunglasses may be placed on the wearer, with the sunglasses typically resting on the user's nose and the temple arms extending over a respective ear.

When conventional sunglasses are worn by a wearer, there is typically a gap on the sides of the sunglasses in the corner where the temple arms extend from the lens-retaining frame portion. This gap is generally located between the sunglasses and the wearer's head. While the tinted lens on the sunglasses may help in mitigating bright lights or conditions that are directly in front of the user's field of view, the gap between the sunglasses and the user may allow bright light to enter the user's eyes, thereby reducing the overall effectiveness of the sunglasses.

In view of the problem associated with these gaps on conventional sunglasses, various side shields have been developed, which are attachable to the sunglasses and which may block bright light from entering through these gaps. Many existing side shields utilize a three-point attachment system, wherein the side shields are attached to the top of the sunglass frame, the bottom of the sunglass frame, and to the temple arms. In view of the connection to the temple arm, when the side shield is attached to the sunglasses, the temple arm may not be pivotable to its closed position. As such, the sunglasses may remain disposed in the open position while the side shield is connected to the sunglasses. Thus, a user may be prevented from collapsing or closing the sunglasses while the side shield is connected to the sunglasses, which may make it difficult to store the sunglasses.

Accordingly, there is a need in the art for a light-blocking side shield configured to be attachable to eyewear and allow temple arms to freely pivot between their open and closed configurations while the side shield is attached to the eyewear. Various aspects of the present disclosure address this particular need, as will be discussed in more detail below.

BRIEF SUMMARY

Various aspects of the present disclosure relate to a light-blocking side shield selectively attachable to a sunglass frame to mitigate or block the passage of light toward the wearer's eyes. The side shield may be formed of a resilient material configured to facilitate two-point mounting contact with the sunglass frame to allow the sunglass frame to be used with the shield, as well as without the shield, without altering the external aesthetics of the sunglass frame. Furthermore, the side shield may include a slot or void formed therein, with the void being aligned with the temple arm when the shield is attached to the sunglass frame to allow for free pivotal movement of the temple arm between its closed and open configurations while the shield remains connected to the sunglass frame. Thus, the shield may no inhibit the normal use of the pivotal temple arms when the shield is connected to the frame.

In accordance with one embodiment of the present disclosure, there is provided a side shield (i.e., shield) for use with an eyeglass frame. The eyeglass frame includes a central portion including a pair of lens frame bodies, and a pair of temple arms pivotally connected to the central portion, with each lens frame body defining an inner periphery. The side shield includes an attachment body having an upper portion, a lower portion, and a side portion extending between the upper portion and the lower portion. The attachment body is sized and configured to be insertable within a respective inner periphery of the lens frame bodies. An upper projection extends from the upper portion of the attachment body and is configured to be engageable with a respective lens frame body. A lower projection extends from the lower portion of the attachment body and is configured to be engageable with the respective lens frame body. A side shielding wall is connected to the attachment body, with the side shielding wall having an upper edge at least partially defining a void sized to allow for pivotal movement of a respective one of the pair of temple arms when the upper and lower projections are engaged with the respective lens frame body.

The side shield may also include an upper shielding wall connected to the attachment body, with the upper shielding wall being spaced from the side shielding wall. The upper shielding wall may at least partially define the void. The upper shielding wall may include a front edge and a side edge intersecting to define a corner therebetween. The corner may define an angle having a magnitude between 80-100 degrees. The side shield may additionally include a front wall extending between upper shielding wall and attachment body. The side shielding wall and the upper shielding wall may be opaque.

The attachment body, the upper projection, the lower projection, the side shielding wall, and the upper shielding wall may be integrally formed with each other.

The attachment body may be of an internal resiliency to impart opposing forces on lens frame body when the upper projection and the lower projection are engaged with the lens frame body.

The attachment body is transitional between a compressed configuration and an extended configuration, a distance between the upper portion and the lower portion decreasing as the attachment body transitions from the extended configuration toward the compressed configuration. The attachment body may be biased toward the extended configuration.

According to another embodiment, there is provided an eyewear assembly comprising an eyeglass frame having central portion including a pair of lens frame bodies, and a pair of temple arms pivotally connected to the central portion. Each lens frame body defines an inner periphery. The eyewear assembly additionally includes a side shield configured to be selectively engageable with the eyeglass frame. The side shield includes an attachment body having an upper portion, a lower portion, and a side portion extending between the upper portion and the lower portion. The attachment body is sized and configured to be insertable within a respective inner periphery of the lens frame bodies. An upper projection extends from the upper portion of the attachment body and is configured to be engageable with a respective lens frame body. A lower projection extends from the lower portion of the attachment body and is configured to be engageable with the respective lens frame body. A side shielding wall is connected to the attachment body. The side shielding wall includes an upper edge at least partially defining a void sized to allow for pivotal movement of a respective one of the pair of temple arms when the upper and lower projections are engaged with the respective lens frame body.

The eyeglass frame includes a first pair of recesses formed in a first one of the pair of frame bodies, the first pair of recesses being configured to receive respective ones of the upper projection and the lower projection.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a light shield for eyewear and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a light-blocking side shield 10 configured to be selectively attachable to an eyeglass frame 12 to block light from entering from entering behind the lens of the eyewear. The side shield 10 may be configured to engage with the eyeglass frame 12 at two generally opposing attachment points or regions, which may allow the side shield 10 to be removably attachable to the eyeglass frame 12. In this regard, the eyeglass frame 12 may be used with or without the side shield 10 without altering the external aesthetics of the eyeglass frame 12. Furthermore, the side shield 10 may include a slot or void which may allow temple arms of the eyeglass frame 12 to be freely pivoted or articulated between closed and open positions without removal of the side shields 10 from the eyeglass frame 12. To install the side shields 10, each side shield 10 may be slightly compressed vertically to allow the same to be registered on each side of the eyeglass frame 12. The internal resilience of the side shields 10 may allow the side shields 10 to engage top and bottom connection portions with the frame 12 and subsequently bias the side shields upwardly and downwardly to maintain the same upon the eyeglass frame 12. Since the side shields 10 may be connected only to the top and bottom portion of the eyeglass frame 12 (and not connected to the temple arms), the temple arms can be freely articulated between the closed and open positions while the side shield 10 remains engaged to the eyeglass frame 12. Furthermore, the side shields 10 may be configured to engage with the front portion of the eyeglass frame 12 without any direct support being provided by the temple arms. In this regard, use of the side shield 10 and the temple arms may be completely independent of one another.

Figure 1:
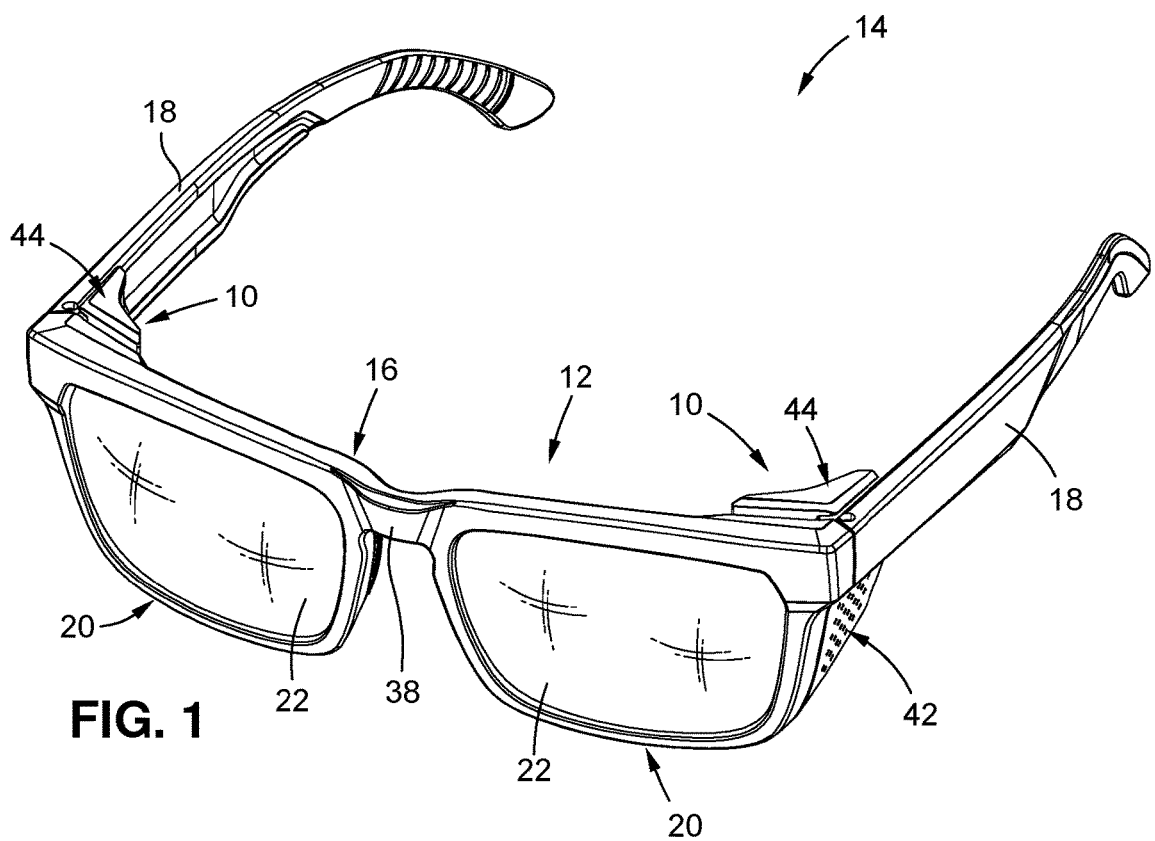
FIG. 1 is a front upper perspective view of an eyewear assembly including an eyeglass frame and a pair of eyewear shields connected to the eyeglass frame.
Figure 2:
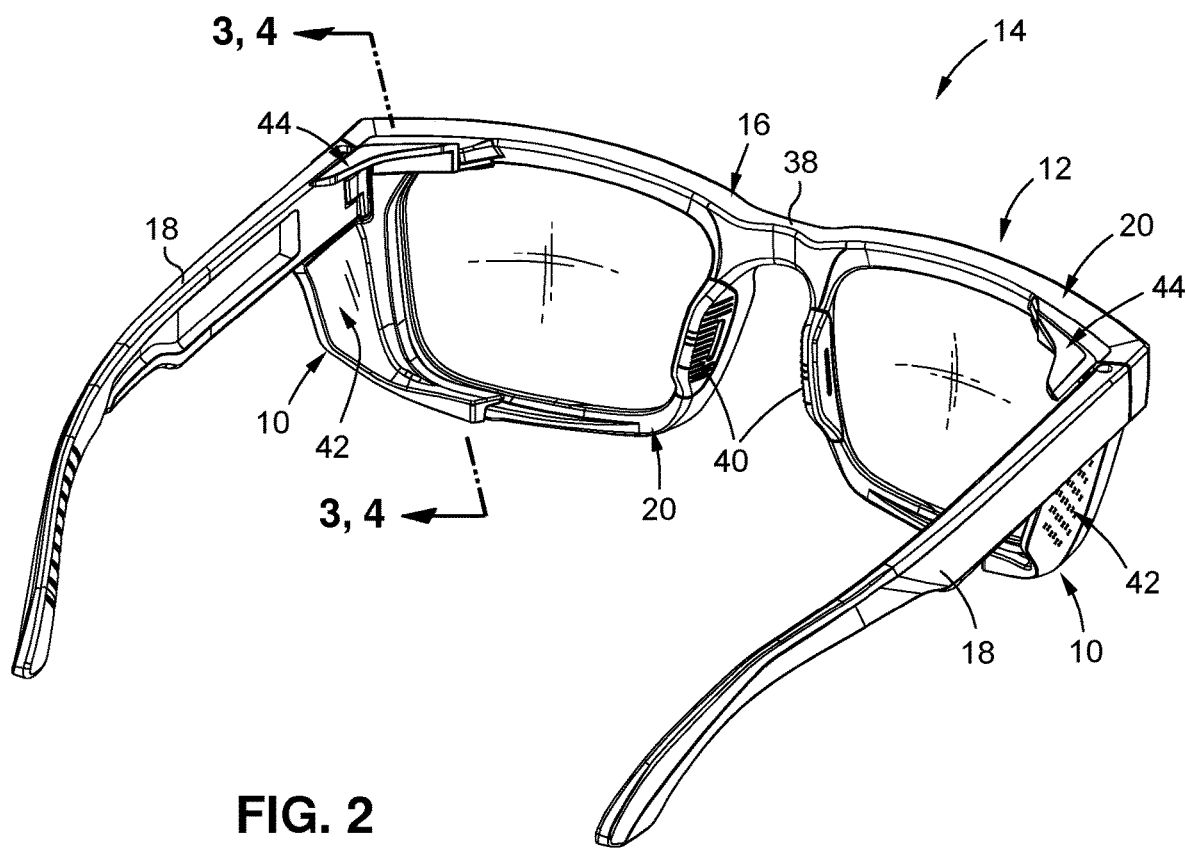
FIG. 2 is a rear upper perspective view of the eyewear assembly depicted in FIG. 1.
Figure 3:
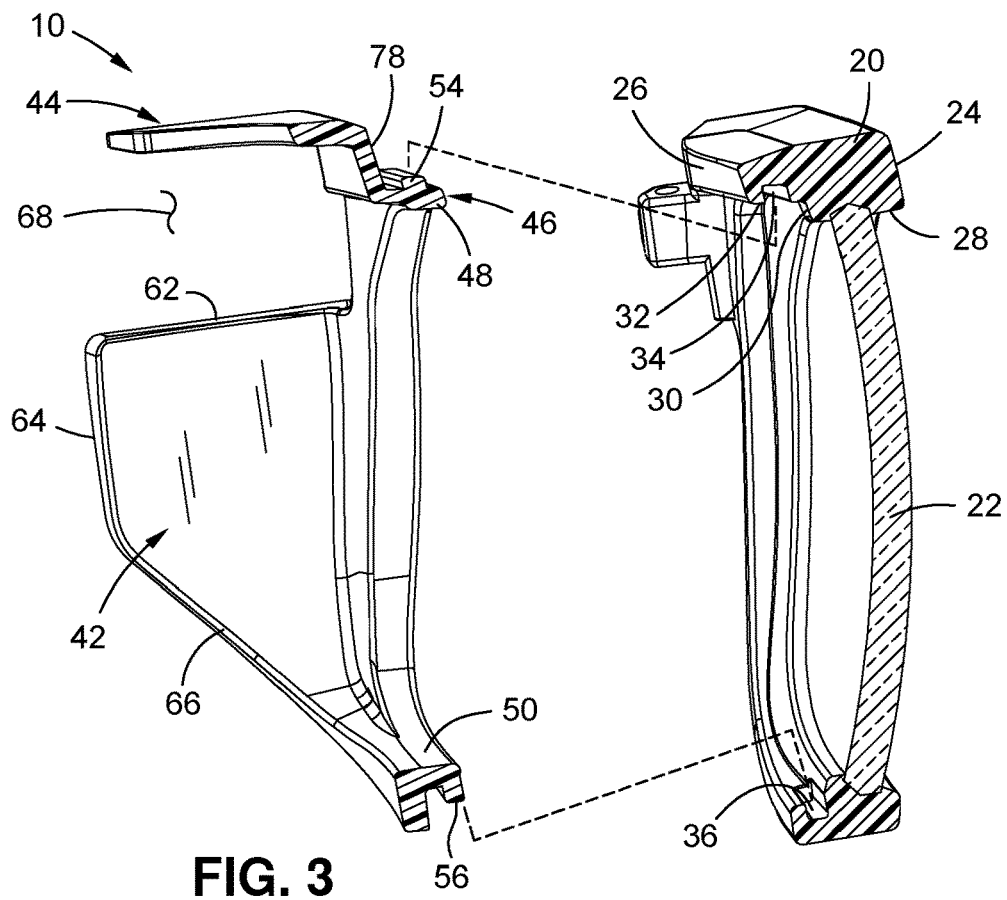
FIG. 3 is an exploded upper perspective cross sectional view of an eyewear shield and the eyeglass frame.
Figure 4:
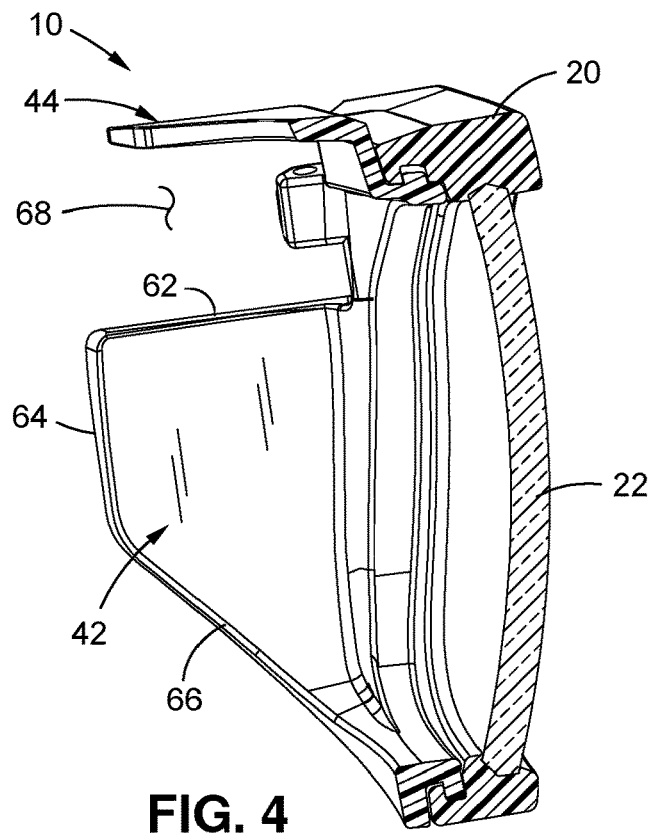
FIG. 4 is an assembled upper perspective cross sectional view of the eyewear shield and the eyeglass frame.
Figure 5:
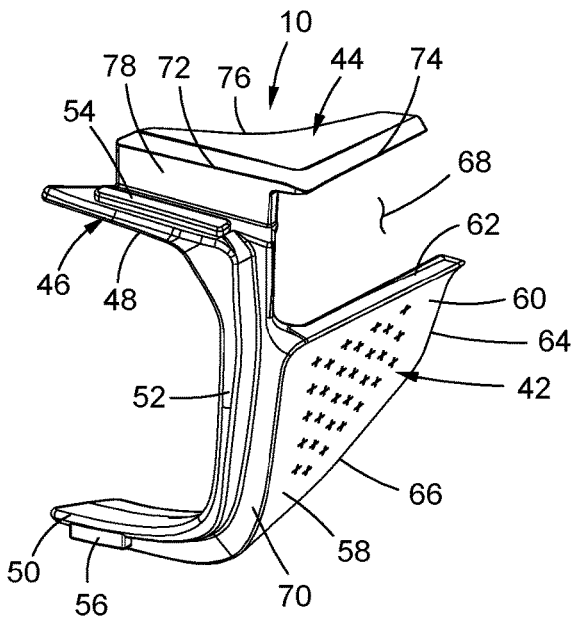
FIG. 5 is an upper perspective view of an eyewear shield.
Figure 6:
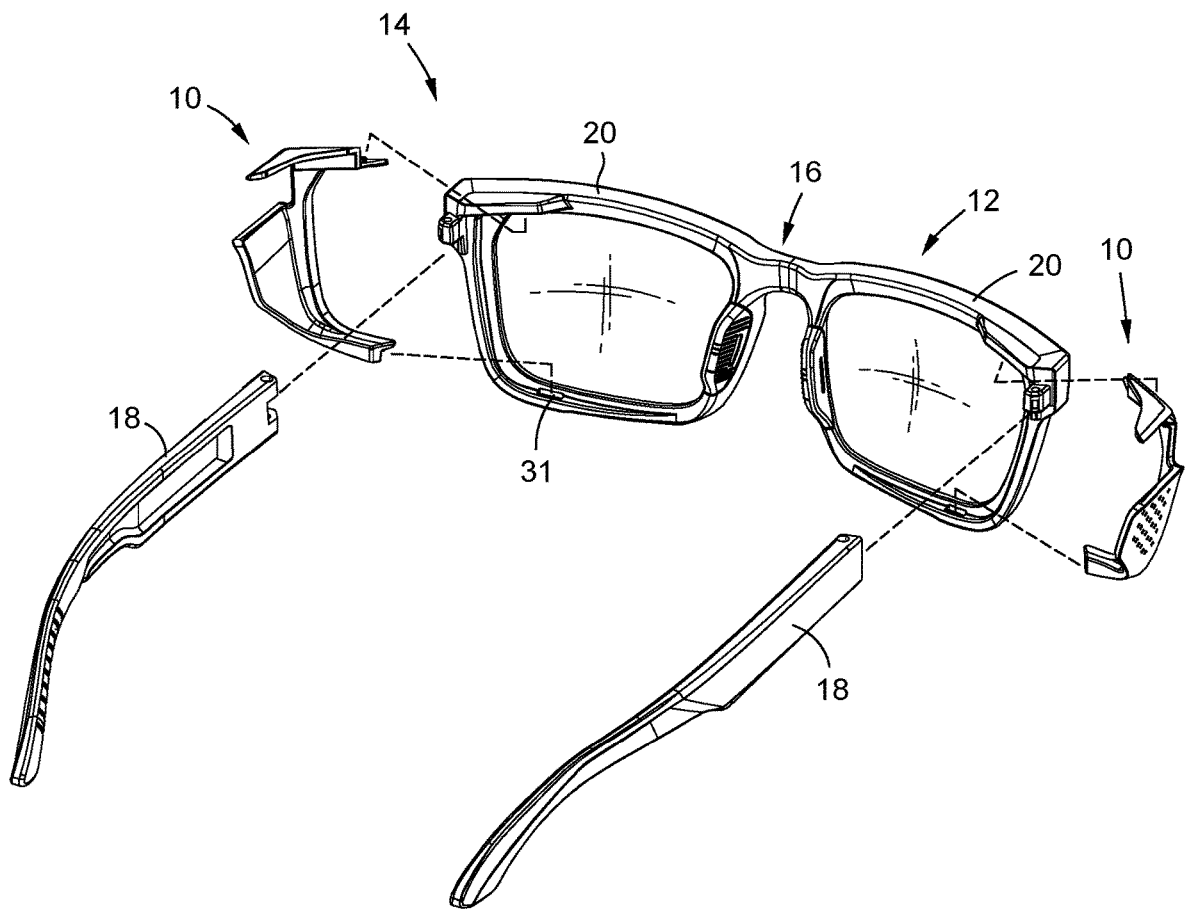
FIG. 6 is an exploded rear upper perspective view of the eyewear assembly.
Figure 7:
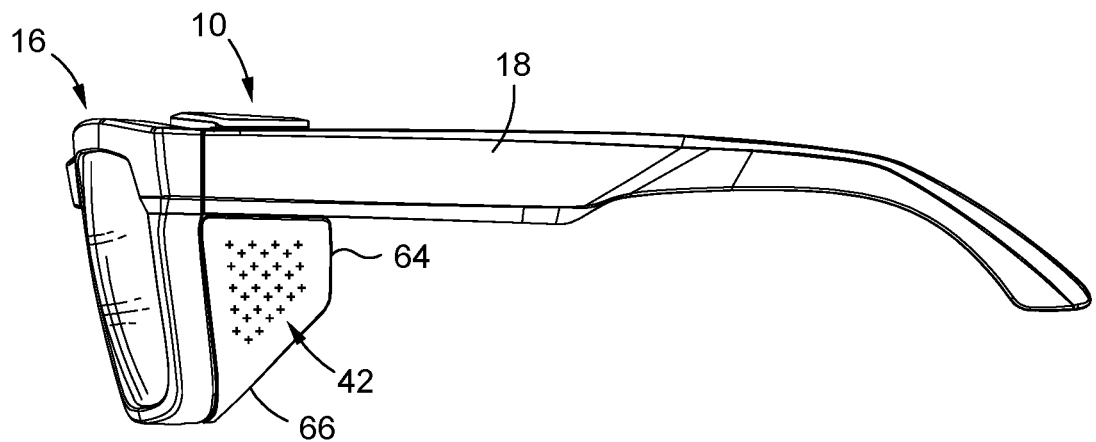
FIG. 7 is a side view of the eyewear assembly depicted in FIG. 1.
Figure 8:
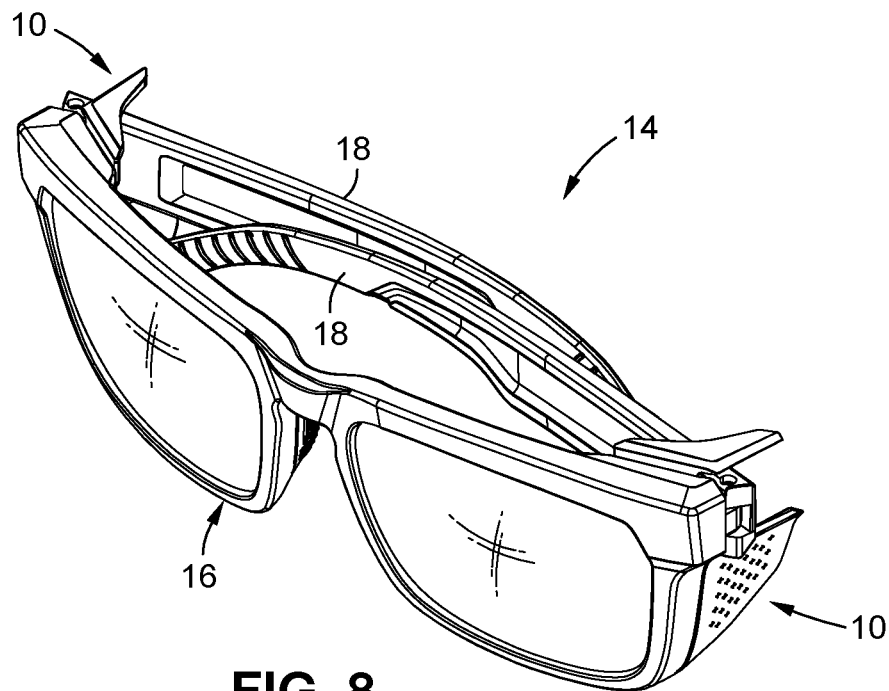
FIG. 8 is an upper perspective view of the eyewear assembly with the eyeglass frame including a pair of temple arms pivoted to a closed position.
Figure 9:
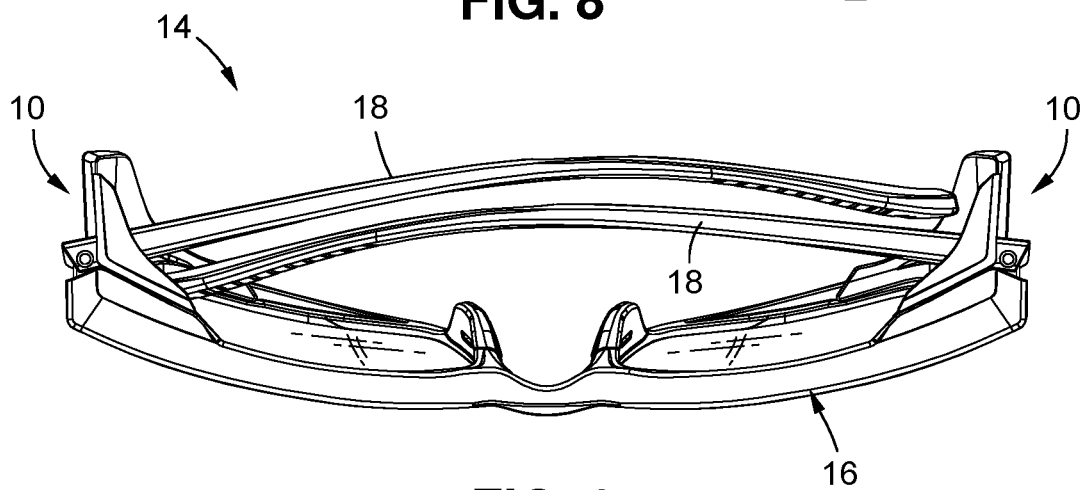
FIG. 9 is a top view of the eyewear assembly depicted in FIG. 8.

Referring now specifically to FIGS. 1 and 2, there is depicted an eyewear assembly 14 including a pair of side shields 10 connected to an eyeglass frame 12. The eyeglass frame 12 includes a central portion 16 and a pair of temple arms 18 pivotally connected to the central portion 16. The central portion 16 includes a pair of lens frame bodies 20 that hold respective lenses 22 to the eyeglass frame 12. FIGS. 3 and 4 are cross sectional views of the eyewear assembly 14, with FIG. 3 showing the side shield 10 disengaged from the lens frame body 20, and FIG. 4 showing the side shield 10 engaged with the lens frame body 20. In this regard, each lens frame body 20 may be specifically sized and configured to engage with a lens 22 as well as a side shield 10.

In the embodiment depicted in FIGS. 3 and 4, each lens frame body 20 includes a front surface 24 and an opposing rear surface 26. In between the front and rear surfaces 24, 26 is an inner circumferential surface 28 defining an opening, through which a user may view when wearing the eyewear. An inner circumferential groove may extend into the lens frame body 20 from the inner circumferential surface 28, with the inner circumferential groove being sized to receive the lens 22 to retain the lens 22 to the lens frame body 20.

The lens frame body 20 may additionally include an intermediate surface 30 extending from the inner circumferential surface 28. A rear circumferential surface 32 extends rearwardly from the intermediate surface 30 to the rear surface 26 of the lens frame body 20 and may define an inner periphery. In this regard, the inner periphery may refer to any portion of the lens frame body 20 adjacent the rear surface 26 and the opening through which the user views through when wearing the sunglasses. The inner periphery of the lens frame body 20 may include the rear circumferential surface 32 and may completely circumnavigate the opening, or only partially extend around the opening. For instance, the inner periphery may include opposed portions (e.g., on the top and bottom) that engage with the side shield 10, as will be explained in more detail below.

A pair of recesses 34, 36 extend into the lens frame body 20 from the rear circumferential surface 32. The pair of recess 34, 36 may be formed in opposing locations, with one recess 34 being formed in an upper segment of the of the lens frame body 20 and the other recess 36 being formed in a lower segment of the lens frame body 20.

The lens frame bodies 20 may be joined together at a bridge 38, and may each be coupled to, or incorporate, a nose pad 40 to facilitate comfortable engagement with a user's nose during use.

The pair of temple arms 18 are pivotally connected to the central portion 16 of the eyeglass frame 12. In particular, each temple arm 18 may be pivotally connected to a lateral portion of a respective lens frame body 20 via a hinge. Each temple arm 18 may independently pivot relative to the corresponding lens frame body 20 between a closed position and an open position. The temple arms 18 move away from the central portion 16 as the temple arms 18 pivot from the closed position toward the open position. In the open position, the temple arms 18 may be generally perpendicular to the central portion 16. When both temple arms 18 are in the open position, the temple arms 18 may be in generally opposed, spaced, parallel relation to each other. When the temple arms 18 are in the closed position, a distal end portion of the temple arms 18 may be in contact with, or may be disposed adjacent, the central portion 16. According to one embodiment, each temple arm 18 may pivot approximately ninety degrees as the temple arm 18 transitions between the closed and open positions. Of course, the pivotal range of motion may be greater than ninety degrees or more than ninety degrees to accommodate the size and shape of the wearer's head.

The side shield 10 may be specifically configured and adapted to be attachable to the eyeglass frame 12 in a manner which does not impede or obstruct pivotal movement of the temple arms 18, and which does not rely on direct structural support from the temple arms 18. According to one embodiment, the side shield 10 generally includes a side shielding wall 42, an upper shielding wall 44, and an attachment body 46. The attachment body 46 may include an upper portion 48, a lower portion 50, and a side portion 52 extending between the upper portion 48 and the lower portion 50. The attachment body 46 is sized and configured to be insertable within an inner periphery of a respective lens frame body 20. In some embodiments, the attachment body 46 may be formed without a side portion 52, and thus, may simply include the upper portion 48 and the lower portion 50, which may fit inside opposing upper and lower portions of the lens frame body 20.

The side shield 10 may include an upper engagement body 54 on the upper portion 48 of the attachment body 46. The upper engagement body 54 may include an upper projection sized to be received in the upper recess 34 on the lens frame body 20. The upper projection 54 may be elongate and extend in a direction that is generally perpendicular to a plane defined by the side shielding wall 42. The size and configuration of the upper projection 54 may be complementary to that of the upper recess 34.

The side shield 10 may additionally include a lower engagement body 56 on the lower portion of the attachment body 46. The lower engagement 56 may include a lower projection sized to be received in a lower recess 36 on the lens frame body 20. The lower projection 56 may be elongate and extend in a direction that is generally perpendicular to a plane defined by the side shielding wall 42. In the exemplary embodiment, the lower projection 56 is shorter in length than the upper projection 54, although it is understood that the scope of the present disclosure is not limited thereto. The size and configuration of the lower projection 56 may be complementary to that of the lower recess 36.

The side shielding wall 42 includes a front portion 58 connected to the attachment body 46. The side shielding wall 42 extends away from the attachment body 46 and terminates at a rear portion 60 thereof. The side shielding wall 42 additionally includes an upper edge 62, a rear edge 64, and a lower edge 66. The upper edge 62 may extend in a front-to-rear direction and at least partially define a slot or void 68 in the side shield 10, with the void 68 being sized to allow for free pivotal movement of a respective one of the pair of temple arms 18 when the side shield 10 is engaged with the eyeglass frame 12, e.g., when the upper and lower projections 54, 56 are engaged with the respective lens frame body 20. In this regard, the void 68 may be positioned on the side shield 10 such that when the side shield 10 is attached to the eyeglass frame 12, the void 68 is aligned with the temple arms 18 (e.g., within the pivotal range of motion of the temple arms 18). In one particular embodiment, the void 68 may be positioned such that a temple arm 18 is received within the void 68 when the side shield 10 is attached to the eyeglass frame 12 and the temple arm is in its open configuration. The temple arm 18 may move freely pivot through the void 68 or out of the void 68 as the temple arm 18 transitions between the open and closed configurations.

The rear edge 64 may extend generally perpendicular to the upper edge 62 in a direction away from the upper shielding wall 44. The lower edge 66 may extend from the rear edge 64 toward the front portion 58 of the side shield 10. The lower edge 66 may be angled relative to the rear edge 64, such that the distance between the upper edge 62 and the lower edge 66 may define a sidewall height that varies in a front-to-rear direction. In this regard, a maximum distance between the lower edge 66 and the upper edge 62 (e.g., maximum height) may be at the front of the side shield 10, and a minimum distance between the lower edge 66 and the upper edge 62 (e.g., minimum height) may be at the rear of the side shield 10.

The side shield 10 may additionally include a side wall 70 extending between the attachment body 46 and the side shielding wall 42. In this regard, the side wall 70 may be sized and configured to extend outwardly from the attachment body 46 to the side shielding wall 42 so as to allow the side shielding wall 42 to be positioned in generally coplanar relation to a side edge of the eyeglass frame 12. In this regard, it is contemplated that in some embodiments, the position of the side shielding wall 42 may be slightly recessed relative to the side edge of the eyeglass frame 12 to provide a hidden or concealed look. It is also contemplated that in some embodiments, the position of the side shielding wall 42 may be slightly outward of the side edge of the eyeglass frame 12.

The upper shielding wall 44 is connected to the attachment body 46, with the upper shielding wall 44 being spaced from the side shielding wall 42 to partially define the void 68. The upper shielding wall 44 may include a front edge 72 and a side edge 74 intersecting to define a corner therebetween. The corner may define an angle having a magnitude between 80-100 degrees and may be complementary to the angle defined between the lens frame body 20 and the temple arm 18 when the temple arm 18 is in the open configuration, such that the upper shielding wall 44 may occupy most, if not all, of that angle when the temple arm 18 is open. The upper shielding wall 44 may further include a rearward edge 76 extending between respective end portions of the front edge 72 and the side edge 74. The rearward edge 76 may define a slightly concave or arcuate configuration to accommodate the user's head during use. In this regard, the rearward edge 76 may be configured to extend adjacent a user's head during use, but preferably, not in contact with the user's head so as to optimize light blocking without compromising comfort.

The side shield 10 may additionally include a front wall 78 extending between the attachment body 46 and the upper shielding wall 44. In this regard, the front wall 78 may be sized and configured to extend outwardly from the attachment body 46 to the upper shielding wall 44 so as to allow the upper shielding wall 44 to be positioned in generally coplanar relation to the upper edge of the eyeglass frame 12. In this regard, it is contemplated that in some embodiments, the position of the upper shielding wall 44 may be slightly recessed relative to the upper edge of the eyeglass frame 12 to provide a hidden or concealed look. It is also contemplated that in some embodiments, the position of the upper shielding wall 44 may be slightly above the upper edge of the eyeglass frame 12.

The side shield 10 may be formed via injection molding to result in a single, unitary structure. Suitable injection molding materials known in the art, such as rubber, plastic, etc., may be used to form the side shield 10. The material used to form the side shield 10 may be an opaque material or have other light-blocking qualities integrated therein. For instance, the side shield 10 may be painted or coated with a light blocking paint or have a light blocking body integrated into the molded structure. In this regard, it may be particularly desirable for the side shielding wall 42 and the upper shielding wall 44 to be opaque or capable of blocking light. In this regard, it is contemplated that the other portions of the side shield 10 (e.g., the attachment body 46, the projections, the front wall and the side wall) may be transparent or translucent. Furthermore, other manufacturing techniques known in the art (other than injection molding), may be used to form the side shield 10 without departing from the spirit and scope of the present disclosure.

The material used to form the side shield 10 may have sufficient internal resiliency to allow for manual compression of the side shield 10 to facilitate attachment of the side shield 10 to the eyeglasses. Exemplary materials may include rubber, plastics, polymers, or other materials in the art known to have sufficient internal resiliency characteristics.

When a user wants to attach the side shield 10 to the eyeglass frame 12, the user may press the attachment body 46 such that a distance between the upper portion 48 and the lower portion 50 decreases and the attachment body 46 assumes a compressed configuration. When the attachment body 46 is in the compressed configuration, the attachment body 46 may be inserted into the lens frame body 20 and the upper and lower projections 54, 56 may be aligned with the corresponding upper and lower recesses 34, 36 formed in the lens frame body 20. When such alignment has occurred, the attachment body 46 may be released, such that the distance between the upper and lower portions 48, 50 increases, and the upper and lower projections 54, 56 are received in the corresponding upper and lower recesses 34, 36. Such movement of the upper and lower portions 48, 50 away from each other corresponds to movement from the compressed position toward an extended position. The extended position may be the position of the upper and lower portions 48, 50 when no external forces are applied to the attachment body 46. The attachment body 46 may be biased toward the extended position. The internal bias of the attachment body 46 may result in opposing forces being applied between the side shield 10 and the eyeglass frame 12 to hold the side shield 10 in place relative to the eyeglass frame 12. These opposing forces may be applied at or adjacent the upper and lower portions 48, 50 of the attachment body 46. Furthermore, the side shield 10 may be retained on the eyeglasses independent of a third force or any retaining force between the temple arms 18 and the side shield. In this regard, the side shield 10 is preferably sized to allow for unrestricted movement of the temple arms 18 between their closed and open positions while the side shield 10 is attached to the eyeglass frame 12. Accordingly, when the side shield 10 is attached to the eyeglass frame 12, the void 68 formed in the side shield 10 may be aligned with the pivotal range of motion of the temple arm 18. It is understood that in some instances, negligible friction forces may occur due to minimal interference between the side shield 10 and the temple arms 18 without departing from the spirit and scope of the present disclosure. In any event, the temple arms 18 may not be completely inhibited or obstructed from transitioning between the closed and open positions while the side shields are attached to the eyewear.

When the side shield 10 is attached to the eyeglass frame 12, the side shield 10 may inhibit light from entering the area between the sunglasses and the user's eyes from the side of the sunglasses, and/or from the top of the sunglasses.

To remove the side shields 10 from the eyeglass frame 12, the user may compress the upper and lower portions 48, 50 to the compressed configuration to withdraw the upper and lower projections 54, 56 from the upper and lower recesses 34, 36. Once the projections 54, 56 have been withdrawn, the user may remove the side shield 10 from the eyeglass frame 12. The ability to selectively attach or remove the side shields 10 from the eyeglass frame 12 allows the eyeglass frame 12 to be use both with or without the side shields 10 without altering the external aesthetics of the eyeglass frame 12.

The eyeglass frame 12 discussed herein is a sunglass frame. However, it is contemplated that the scope of the present disclosure is not limited thereto. In this regard, the eyeglass frame 12 may also include conventional eyeglasses, sports goggles, protective eyewear, or other forms of eyewear known in the art.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An eyewear assembly comprising:
   an eyeglass frame having a central portion including a pair of lens frame bodies, and a pair of temple arms pivotally connected to the central portion, each lens frame body defining an inner periphery; and
   a side shield configured to be selectively engageable with the eyeglass frame, the side shield comprising:
   an attachment body having an upper portion, a lower portion, and a side portion extending between the upper portion and the lower portion, the attachment body being sized and configured to be insertable within a respective inner periphery;
   an upper projection extending from the upper portion of the attachment body and configured to be engageable with a respective lens frame body to hold the side shield fixedly in relation to the central portion;
   a lower projection extending from the lower portion of the attachment body and configured to be engageable with the respective lens frame body to hold the side shield fixedly in relation to the central portion;
   a side shielding wall connected to the attachment body, the side shielding wall having an upper edge at least partially defining a void sized to allow for pivotal movement of a respective one of the pair of temple arms when the upper and lower projections are engaged with the respective inner periphery of the lens frame body; and
   an upper shielding wall connected to the attachment body, the upper shielding wall at least partially defining the void and the upper shielding wall being completely spaced from the side shielding wall by the void;
   wherein, when the side shield is engaged with the inner periphery of the central portion and the temple arms pivot between closed and open positions, the side shield remains fixed in relation to the central portion, the void being sized to allow for free pivotal movement of a respective temple arm through the side shield.

2. The eyewear assembly recited in claim 1, wherein the eyeglass frame includes a first pair of recesses formed in a first one of the pair of lens frame bodies, the first pair of recesses being configured to receive the upper projection and the lower projection, respectively.

3. The eyewear assembly recited in claim 1, further comprising an upper shielding wall connected to the attachment body, the upper shielding wall being spaced from the side shielding wall.

4. The eyewear assembly recited in claim 3, wherein the upper shielding wall at least partially defines the void.

5. The eyewear assembly recited in claim 3, wherein the side shielding wall and the upper shielding wall are opaque.

6. The eyewear assembly recited in claim 1, wherein the attachment body is of an internal resiliency to impart opposing forces on lens frame body when the upper projection and the lower projection are engaged with the lens frame body.

7. The eyewear assembly recited in claim 1, wherein the attachment body is transitional between a compressed configuration and an extended configuration, a distance between the upper portion and the lower portion decreasing as the attachment body transitions from the extended configuration toward the compressed configuration.

8. The eyewear assembly according to claim 1, wherein the temple arm is received within the void when the side shield is attached to the eyeglass frame and the temple arm is an open configuration.

9. The eyewear assembly according to claim 1, wherein the upper shielding wall includes a front edge and a side edge intersecting to define a corner therebetween.

10. The eyewear assembly according to claim 1, wherein the corner defines an angle having a magnitude between 80-100 degrees.

11. The eyewear assembly according to claim 1, further comprising a front wall extending between upper shielding wall and attachment body.

12. The eyewear assembly according to claim 1, wherein the attachment body, the upper projection, the lower projection, the side shielding wall, and the upper shielding wall are integrally formed with each other.

13. The eyewear assembly according to claim 1, wherein the upper projection is elongated along the upper portion and extends in a direction perpendicular to a plane defined by the side shielding wall and the lower projection is elongated along the upper portion and extends in a direction perpendicular to a plane defined by the side shielding wall.

14. The eyewear assembly according to claim 2, wherein the first pair of recesses comprises a size and a configuration complementary to that of the upper projection and the lower projection.

* * * * *